No. 11,700. Reissued Oct. 25, 1898.
W. E. F. MARCHAL.
DRIVING CHAIN COVER.
(Application filed Sept. 19, 1898.)
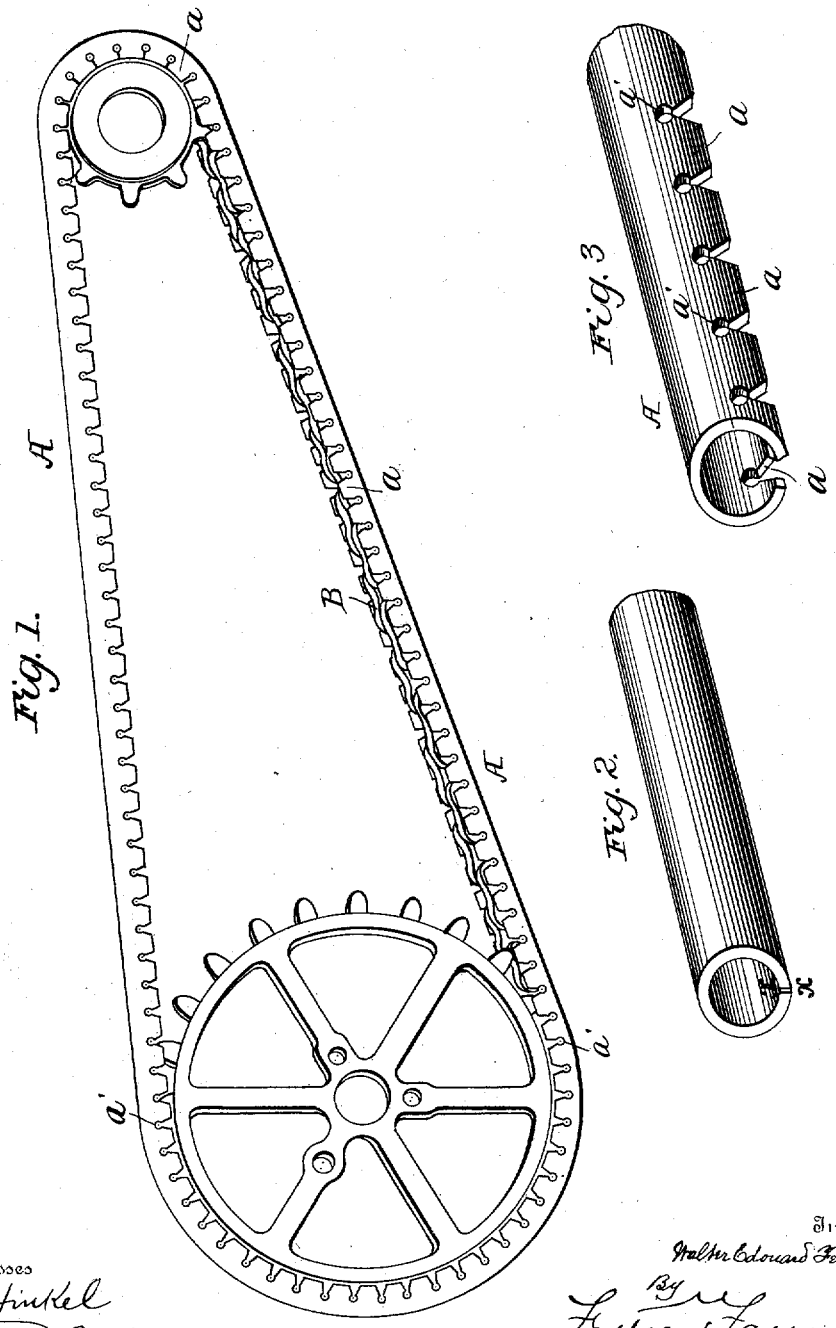
Witnesses
J. G. Stinkel
Harry E. Hay.
Inventor
Walter Edouard Felix Marchal
By
Foster Freeman
Attorneys
THE NORRIS PETERS CO., PHOTO-LITHO., WASHINGTON, D. C.

UNITED STATES PATENT OFFICE.

WALTER EDOUARD FELIX MARCHAL, OF ST. MANDÉ, FRANCE.

DRIVING-CHAIN COVER.

SPECIFICATION forming part of Reissued Letters Patent No. 11,700, dated October 25, 1898.

Original No. 609,037, dated August 16, 1898. Application for reissue filed September 19, 1898. Serial No. 691,381.

*To all whom it may concern:*

Be it known that I, WALTER EDOUARD FELIX MARCHAL, a citizen of the French Republic, residing at St. Mandé, in the Department of the Seine, France, have invented certain new and useful Improvements in Driving-Chain Covers, of which the following is a specification.

My invention relates to a chain-cover for the chains of cycles, automotors, and generally for all transmission-chains which need protection against dust, damp, mud, and the like.

My invention is based in principle on the employment of an elastic tube, preferably of india-rubber, of transverse, circular, elliptical, or polygonal closed section, open throughout its length (along a generating-line) and furnished with suitable slots on the edges of the slit in order to allow of its being closely applied to the chain and suitably adjusted.

The subject-matter of my invention has been patented to me in the following countries: France, No. 270,592, dated September 20, 1897; Belgium, No. 130,732, dated September 20, 1897; Germany, No. 96,730, dated September 21, 1897, and Great Britain, No. 21,806, dated September 23, 1897.

The two ends of the slit tube are joined together in any suitable manner. The length of the chain-cover thus formed must be slightly smaller than the length of the chain, so that the slight tension and the bilateral pressure caused by the tendency of the elastic material to resume its original closed section (being the tendency of the edges of the tube to come together again) suffices amply for keeping the chain-cover on the chain. Not only is no fastening of the chain-cover to the chain thus necessary, but such would be, in fact, objectionable, the apparatus when in action passing over a slightly-longer distance than the chain, whence results a continuous friction and an automatic cleaning.

In order that my invention may be understood, I annex drawings to the present description.

In the drawings, Figure 1 is a perspective view showing the application of the chain-cover forming my invention to the chain of a safety-bicycle. Fig. 2 is a perspective view, on a larger scale, of a piece of tube of circular section before the opening has been effected along the generating-line, the cut first made being indicated by the letters X X. Fig. 3 is a similar view of the tube after being cut and opened and provided with the slots. This figure shows the natural shape assumed by the tube when the chain is not attached thereto.

The two edges or lips *a a* of the tube A when in use press against the sides of the chain B, so that no other fastening is necessary.

In order to allow the chain-cover to follow the movement of the chain and to remain properly attached thereto during the rotation of the wheels or pinions, suitable slots *a'* are formed at certain regular intervals in the edges of the chain-cover A. These slots may be of any suitable form. In the drawings I have shown them as being V shape, with a circular opening at the top. Fig. 1 shows without the necessity of further explanation how these slots allow the chain-cover to adapt itself to the different curves or indentations of the chain.

As I have previously stated, the idea of forming the chain-cover by means of a tube of originally-closed transverse section enables me to dispense with the use of fastenings, so that the chain-cover is free to slide longitudinally on the chain in motion (which actually occurs in practice) and produces an automatic and continuous cleaning of the chain.

The chain-cover constituting my invention is exceedingly light, very inexpensive, and very easy to put on and take off. I am aware that india-rubber chain-covers similar to mine have been employed already; but such are not formed of a tube of originally-closed transverse section, but, on the contrary, have a U-shaped profile, so that the edges have no tendency to press against the chain, and consequently fastenings are generally necessary. Hence the automatic cleaning during the working of the chain cannot be effected.

In conclusion I would observe that I have only given the annexed drawings by way of demonstration and that my invention may be carried out in many other ways. Thus, for example, instead of soldering or fastening together the ends of the split tube to form a continuous chain-cover I can make the tube endless, and instead of employing a tube of circular section I can make use of a tube of originally elliptical or polygonal section—for instance, hexagonal, octagonal, &c.—while instead of making the tube of india-rubber I can make use of a tube of any suitable elastic material or composition.

It will be easily understood from the foregoing that the chain-cover can be applied not only to cycle-chains, but to transmission-chains of other kinds.

Having now particularly described and ascertained the nature of my said invention and in what manner the same is to be performed, I declare that what I claim is—

1. A flexible chain-cover formed with a slit and in its inner side edges with separated slots, said cover being adapted to embrace the sides and outer face of a driving-chain, substantially as described.

2. An endless, slitted chain-cover formed of elastic material and having separated slots in its inner side edges, said cover being adapted to embrace the sides and outer face of a driving-chain, substantially as described.

3. A chain-cover comprising a tube of elastic material, slit along its length, whereby the tendency of the cover to resume its original closed section, will retain it in place on the chain, substantially as described.

In testimony whereof I have hereunto set my hand in the presence of two subscribing witnesses.

WALTER EDOUARD FELIX MARCHAL.

Witnesses:
CHARLES VICTOR CHIERRY,
MICHEL CHIERRY.